US009691413B2

(12) United States Patent
Zad Issa

(10) Patent No.: US 9,691,413 B2
(45) Date of Patent: Jun. 27, 2017

(54) IDENTIFYING SOUND FROM A SOURCE OF INTEREST BASED ON MULTIPLE AUDIO FEEDS

(71) Applicant: Syavosh Zad Issa, Kirkland, WA (US)

(72) Inventor: Syavosh Zad Issa, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/876,666

(22) Filed: Oct. 6, 2015

(65) Prior Publication Data

US 2017/0098457 A1 Apr. 6, 2017

(51) Int. Cl.
*G10L 21/00* (2013.01)
*G10L 15/00* (2013.01)
(Continued)

(52) U.S. Cl.
CPC .......... *G10L 25/78* (2013.01); *G10L 21/0388* (2013.01); *G10L 21/055* (2013.01); *G10L 2025/783* (2013.01)

(58) Field of Classification Search
CPC ..................... G10L 15/20; G10L 25/84; G10L 2021/02082; G10L 21/0216;
(Continued)

(56) References Cited

U.S. PATENT DOCUMENTS 4,600,815 A * 7/1986 Horna .................. H04M 9/082 379/390.01
4,741,038 A * 4/1988 Elko .................... G10K 11/346 367/121
(Continued)

FOREIGN PATENT DOCUMENTS

| | | | |
|---|---|---|---|
| WO | 2004038695 | A1 | 5/2004 |
| WO | 2015065362 | A1 | 5/2015 |

OTHER PUBLICATIONS

Yousefian, N., Akbari, A., & Rahmani, M. (2009). Using power level difference for near field dual-microphone speech enhancement. Applied Acoustics, 70(11), 1412-1421.*
(Continued)

*Primary Examiner* — Edgar Guerra-Erazo
(74) *Attorney, Agent, or Firm* — Shook, Hardy & Bacon L.L.P.

(57) ABSTRACT

Methods and systems for identifying sound from a source of interest are provided for herein. In some embodiments, a first audio feed is captured by a first microphone and a second audio feed is captured by a second microphone. The first microphone may be located closer in proximity to the source of interest than the second microphone. The first audio feed can be processed utilizing the second audio feed to produce a first processed audio feed that can enable identification of sound originating from the source of interest. In some embodiments, the second audio feed can be additionally processed utilizing the first audio feed to produce a second processed audio feed. In such embodiments, frequencies from the first processed audio feed can be compared against frequencies of the second processed audio feed to identify sound originating from the source of interest. Other embodiments may be described and/or claimed herein.

20 Claims, 6 Drawing Sheets

(51) Int. Cl.
*G10L 25/78* (2013.01)
*G10L 21/055* (2013.01)
*G10L 21/0388* (2013.01)

(58) Field of Classification Search
CPC ........... G10L 2021/02166; G10L 25/78; G10L 15/02; G10L 21/028; H04M 9/082; H04R 3/005
USPC .......................... 704/208, 233, 205, 225, 226
See application file for complete search history.

(56) References Cited

U.S. PATENT DOCUMENTS 5,305,307 A * 4/1994 Chu ...................... H04M 9/082 370/288
5,463,694 A 10/1995 Bradley et al.
5,471,527 A * 11/1995 Ho ........................... H03G 5/22 379/347
5,796,818 A * 8/1998 McClennon .......... H04M 9/082 379/388.02
5,839,101 A * 11/1998 Vahatalo ............. G10L 21/0208 704/217
6,163,608 A * 12/2000 Romesburg ........... H04M 9/082 379/406.01
6,212,273 B1 * 4/2001 Hemkumar .......... H03G 3/3005 379/392
6,219,645 B1 4/2001 Byers
6,570,985 B1 * 5/2003 Romesburg .............. H04B 3/23 379/390.02
6,570,986 B1 * 5/2003 Wu ....................... H04M 9/082 379/406.01
6,665,402 B1 * 12/2003 Yue ........................ H04B 3/234 370/286
6,738,482 B1 * 5/2004 Jaber ...................... H04R 1/406 379/406.01
6,799,062 B1 * 9/2004 Piket ..................... H04M 9/082 379/388.01
7,024,353 B2 * 4/2006 Ramabadran ........... G10L 25/78 704/205
7,242,762 B2 * 7/2007 He ........................... H04B 3/23 379/406.07
7,254,194 B2 * 8/2007 Lin ....................... H03G 3/3089 375/317
7,388,954 B2 * 6/2008 Pessoa ..................... H04B 3/23 379/386
7,627,111 B2 * 12/2009 Bershad ................... H04B 3/23 379/406.02
8,077,641 B2 * 12/2011 Basu ...................... H04B 3/234 370/286
2003/0053639 A1 * 3/2003 Beaucoup ........... G10L 21/0208 381/92
2003/0063759 A1 4/2003 Brennan et al.
2004/0124827 A1 * 7/2004 Winn ................. G01R 31/2884 324/76.39
2005/0143988 A1 * 6/2005 Endo ................... G10L 21/0208 704/226
2005/0213778 A1 9/2005 Buck et al.
2006/0147063 A1 7/2006 Chen
2006/0149542 A1 * 7/2006 Tanrikulu .............. H04M 9/082 704/233
2007/0033020 A1 2/2007 (Kelleher) Francois et al.
2008/0270131 A1 10/2008 Fukuda et al.
2008/0317259 A1 12/2008 Zhang et al.
2009/0204409 A1 8/2009 Mozer et al.
2012/0059648 A1 3/2012 Burnett et al.
2014/0222436 A1 8/2014 Binder et al.

OTHER PUBLICATIONS

Qi, et al., "Automotive 3-Microphone Noise Canceller in a Frequently Moving Noise Source Environment", In International Journal of Electrical, Computer, Electronics and Communication Engineering vol. 1, No. 7, Retrieved on: May 25, 2015, pp. 1018-1024.
"International Search Report and Written Opinion Issued in PCT Application No. PCT/US2016/051562", Mailed Date: Nov. 15, 2016, 11 Pages.
Choi, et al., "Dual-Microphone Voice Activity Detection Technique Based on Two-Step Power Level Difference Ratio" In the Proceedings of IEEE/ACM Transactions on Audio, Speech, and Language Processing, vol. 22, Issue 6, pp. 1069-1081.
Maj, et al., "Comparison of Adaptive Noise Reduction Algorithms in Dual Microphone Hearing Aids", In Speech Communication, vol. 48, Issue 8, pp. 957-970.
"International Preliminary Report on Patentability Issued in PCT Application No. PCT/US2016/051562", Mailed Date: Feb. 23, 2017, 7 Pages.

* cited by examiner

IDENTIFYING SOUND FROM A SOURCE OF INTEREST BASED ON MULTIPLE AUDIO FEEDS

BACKGROUND

Identifying sound originating from a source of interest can be problematic. This is especially so in the presence of background noise which can be sporadic in nature. Systems which rely on identification of sound originating from a source of interest, such as, for example a voice activity detector, utilize various mechanisms to attempt to distinguish when sound is originating from the source of interest and when sound is merely background noise. These various mechanisms, however, suffer from a number of weaknesses. One such weakness is that many of these various mechanisms are complex in nature and perform resource-intensive computations. As a result, these various mechanisms are generally not suitable for low power or low cost applications. In addition, many of these various mechanisms rely on statistical models or heuristics that are developed through machine learning or template matching which adds to the complexity of these systems. Developing such statistical models or heuristics and the corresponding system components for identifying sound originating from a source of interest usually requires a significant amount of effort.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described herein include methods, computer-storage media, and systems for identifying sound originating from a source of interest. In various embodiments, a first audio feed is captured by a first microphone of a computing device, and a second audio feed is captured by a second microphone of the computing device. The first audio feed can be processed utilizing the second audio feed to identify sound originating from the point of interest. This processing, in some embodiments, would include time synchronizing the first audio feed with the second audio feed, for example, by applying a delay to either the first audio feed or the second audio feed. This processing can also include attenuating, or filtering, frequencies from the first audio feed, based on corresponding frequencies within the second audio feed. In various embodiments, this processing can also include processing the second audio feed, utilizing the first audio feed, to further enable the identification of sound originating from the point of interest. Again, in such embodiments, the processing can include attenuating, or filtering, frequencies from the second audio feed, based on corresponding frequencies from the first audio feed.

BRIEF DESCRIPTION OF THE DRAWINGS

The present disclosure is described in detail below with reference to the attached drawing figures.

DETAILED DESCRIPTION

Figure 1:
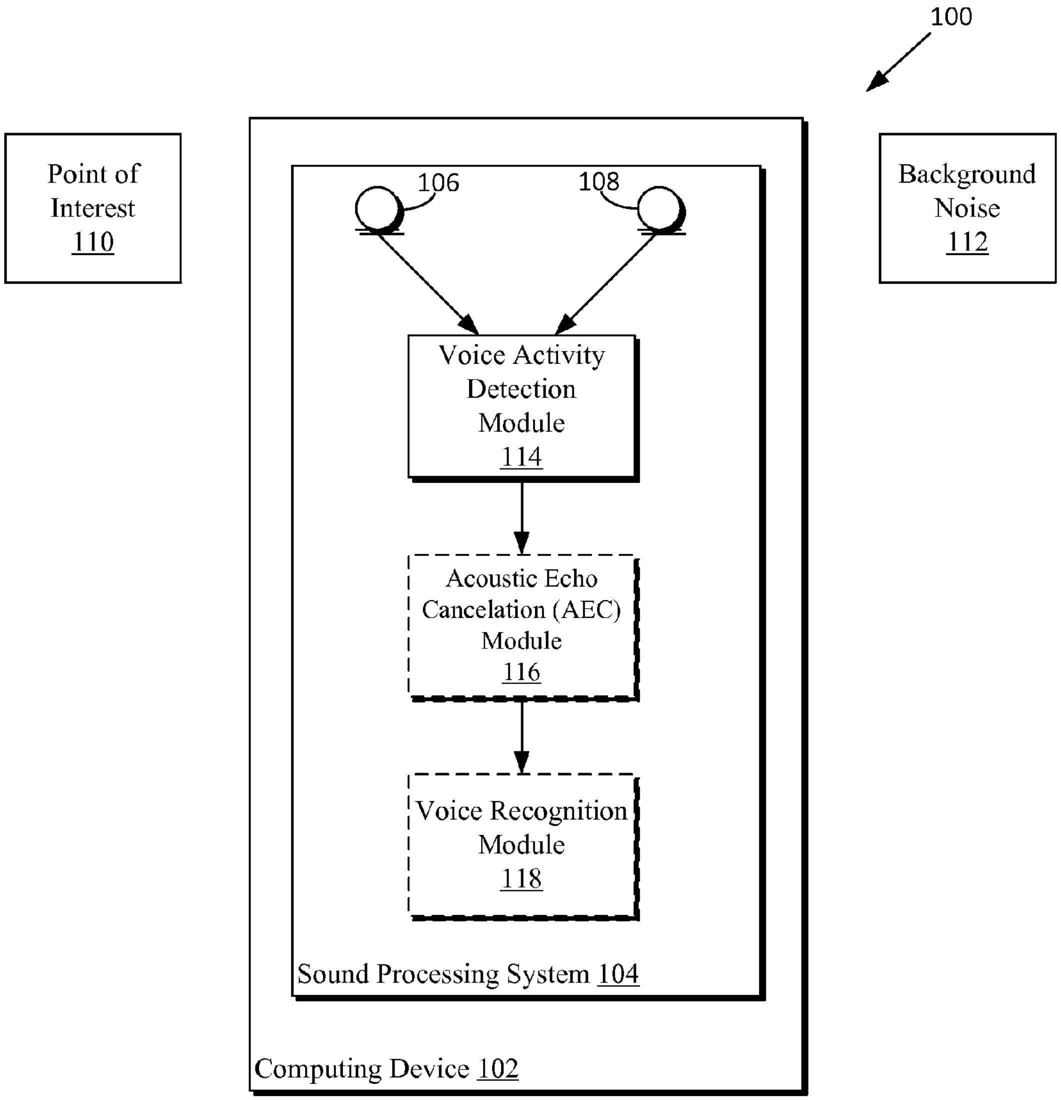
FIG. 1 is a block diagram of an operating environment in which various embodiments of the present disclosure can be employed.

The subject matter of embodiments of this disclosure are described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion below, embodiments are described with reference to a system for identifying sound originating from a source of interest language; the system can implement several components for performing the functionality of embodiments described herein. Components can be configured for performing novel aspects of embodiments, where "configured for" comprises "programmed to" perform particular tasks or implement particular abstract data types using code. It is contemplated that the methods and systems described herein can be performed in different types of operating environments having alternate configurations of the functional components. As such, the embodiments described herein are merely illustrative, and it is contemplated that the techniques may be extended to other implementation contexts.

Various embodiments disclosed herein enable identification of sound originating from a direction of a point of interest utilizing multiple audio feeds. This can be accomplished by processing audio feeds, as described herein, captured by multiple microphones where at least one microphone is known to be closer in proximity to the point of interest. This processing can help identify a likelihood that an audio feed contains an acoustic signal originating from the direction of the point of interest and can therefore limit the processing of that audio feed based on that likelihood. Limiting the processing of the audio feed in this manner enables, for instance, low power voice activity detection that can be utilized to reduce the amount of power consumed while a device is operating, for example, in an always listening mode. Additional benefits of the disclosed embodiments are discussed throughout disclosure.

FIG. 1 is a block diagram of an operating environment 100 in which various embodiments of the present disclosure can be employed. As depicted, operating environment 100 includes a computing device 102. Computing device 102 includes a sound processing system 104. Sound processing system 104 can be configured to identify sound from a source of interest (e.g., point of interest 110). As used herein, a source of interest is an entity (e.g., a user) that produces, directly or indirectly, a sound of interest (e.g., the user's voice), whereas a point of interest may generally be utilized to indicate a location, or expected location, of a source of interest. It will be appreciated that, although sound processing system 104 is the only component depicted in computing device 102 this is merely for simplicity of explanation. Computing device 102 can contain, or include, any number of other components that would be readily recognized within the art.

To accomplish the identification of sound from a source of interest, sound processing system 104, in the depicted embodiment, includes a first audio capture device 106 and a second audio capture device 108. Audio capture devices 106 and 108 can represent any type of device, or devices, configured to capture sound, such as, for example, a microphone. Such a microphone could be omnidirectional or directional in nature. Audio capture devices 106 and 108 can be configured to capture acoustic signals traveling through the air and convert these acoustic signals into electrical signals. As used herein, reference to an audio feed can refer to either the acoustic signals captured by an audio capture device or the electrical signals that are produced by an audio capture device. In addition, audio capture devices 106 and 108 may be of the same type of audio capture device or could be different from one another. For example, audio capture device 106 could be a directional microphone configured for a configured frequency response range and audio capture device 108 could be an omnidirectional microphone configured with the same frequency response range, or a different frequency response range. As depicted, audio capture device 106 is located closer in proximity to point of interest 110 than audio capture device 108. In some embodiments, for example, where a source of background noise is known, audio capture device 108 can be located closer in proximity to a background noise source 112. As such it can be assumed, at least with respect to the depicted embodiment, that point of interest 110 is positioned at a relatively consistent position away from audio capture device 106 to maintain the above mentioned closeness in proximity. In addition, it will be appreciated that, depending on various factors, such as, for example, the sensitivity and directionality of the respective audio capture devices, point of interest 110 may need to be located in a specific direction or range of directions from audio capture device 106. For instance, if audio capture device 106 is a directional microphone then the directionality within which point of interest 110 can be located may be more limited than if audio capture device 106 is an omnidirectional microphone.

Sound processing system 104 also includes a voice activity detection module 114 coupled with audio capture devices 106 and 108. Voice activity detection module 114 can be configured to receive and process signals, or audio feeds, output by audio capture devices 106 and 108. This processing can enable voice activity detection module 114 to identify sound originating from point of interest 110, as discussed in detail below. It will be appreciated that, while a voice activity detection module 114 is depicted in FIG. 1, this disclosure is not to be limited solely to voice activity detection. The voice activity detection module 114 is merely meant to be illustrative of a possible implementation of the present disclosure and any device that is configured to identify sound originating from a point of interest is explicitly contemplated to be within the scope of this disclosure.

As depicted, voice activity detection module 114 is configured to receive a first audio feed from audio capture device 106 and a second audio feed from audio capture device 108. In embodiments, voice activity detection module 114 can be configured to process the first audio feed, utilizing the second audio feed, to enable the identification of sound originating from point of interest 110, or sound originating from the direction of point of interest 110.

In some embodiments, the processing of the first audio feed utilizing the second audio feed can include attenuating, or filtering, frequencies from the first audio feed, that are shared between the first audio feed and the second audio feed. As used herein, a frequency that is shared between two audio feeds refers to a frequency that is contained within both audio feeds. To put it another way, a shared frequency between the first audio feed and the second audio feed would include frequencies that are contained within the first audio feed that are also contained within the second audio feed. The output of this processing can be an attenuated, or filtered, audio feed. To attenuate frequencies of the first audio feed that exist within the second audio feed includes reducing the amplitude of these frequencies within the first audio feed. In contrast, to filter frequencies of the first audio feed that exist within the second audio feed includes removing these shared frequencies from the first audio feed. In some embodiments, such filtering may also take into account amplitudes of the respective frequencies. In such embodiments, the frequencies being filtered from the first audio feed would only be removed to the extent of the amplitude of the frequency contained within the second audio feed. For example, if a shared frequency has amplitude of X in the first audio feed and amplitude of Y in the second audio feed, the resulting filtered frequency may have amplitude of X-Y. If Y is greater than X, then the resulting filtered frequency may merely be completely removed from the first audio feed. This processing is depicted by, and discussed further in reference to, FIG. 2A, below.

To accomplish the above processing of the first audio feed utilizing the second audio feed, the first audio feed and the second audio feed may need to be time synchronized with one another. As used herein, to time synchronize two audio feeds refers to aligning the two audio feeds to a point in time such that the two audio feeds can be compared against one another at a point in time. For example, sound produced by point of interest 110 will reach audio capture device 106 prior to reaching audio capture device 108. As such, to time synchronize the first audio feed with the second audio feed could include applying a delay to the first audio feed to account for the delay between sound reaching the audio capture device 106 and that same sound reaching the audio capture device 108. Consequently, in such an example, the delay applied to the first audio feed would represent the amount of time it takes for sound to travel from audio capture device 106 to audio capture device 108.

In various embodiments, voice activity detection module 114 can also be configured to process the second audio feed, utilizing the first audio feed, to further enable the identification of sound originating from point of interest 110, or at least sound originating from the direction of point of interest 110. In such embodiments, the processing of the second audio feed utilizing the first audio feed can mirror that of the processing of the first audio feed utilizing the second audio feed discussed above. For example, this processing could include attenuating, or filtering, frequencies from the second audio feed, that are shared between the second audio feed and the first audio feed. The output of this processing can be another attenuated, or filtered, audio feed. This processing is depicted by, and discussed further in reference to, FIG. 2B, below.

As with the processing of the first audio feed, to accomplish the above processing of the second audio feed utilizing the first audio feed can include time synchronizing the second audio feed with the first audio feed. This time synchronizing could mirror that discussed above in reference to time synchronizing of the first audio feed with the second audio feed. For example, sound produced by background noise 112 will reach audio capture device 108 prior to reaching audio capture device 106. As such, to time synchronize the second audio feed with the first audio feed could include applying a delay to the second audio feed to account for the delay between sound reaching audio capture device 108 and that same sound reaching audio capture device 106. Consequently, in such an example, the delay applied to the first audio feed would represent the amount of time it takes for sound to travel from audio capture device 106 to audio capture device 108.

Voice activity detection module 114 can, in some embodiments, then be configured to compare various frequency bands, or frequency ranges, between the attenuated, or filtered, audio feed produced from the first audio feed, hereinafter merely referred to as the first processed audio feed, and the attenuated, or filtered, audio feed produced from the second audio feed, hereinafter merely referred to as the second processed audio feed. The voice activity detection module 114 can be configured to determine a source confidence level that is indicative of whether sound is originating from point of interest 110. Such a determination may be based on the number of frequency bands of the first processed audio feed that exceed a predefined, or preconfigured, threshold of difference from corresponding frequency bands of the second processed audio feed. In embodiments, a higher value for the source confidence level can be more indicative of sound within the first processed audio feed originating from point of interest 110 than a lower value for the source confidence level.

In various embodiments, voice activity detection module 114 can also be configured to compare the above mentioned various frequency bands, or frequency ranges, between the first processed audio feed and the second processed audio feed to determine a noise, or background noise, confidence level. This noise confidence level is indicative of whether the first processed audio feed is noise. Such a determination may be based on the number of frequency bands of the first processed audio feed that are within a predefined, or preconfigured, threshold of difference from corresponding frequency bands of the second processed audio feed. In embodiments, a higher value for the noise confidence level can be more indicative of sound being noise within the first processed audio feed than a lower value for the noise confidence level.

It will be appreciated that, while the above description is directed towards an embodiment where point of interest 110 is located in closer proximity to audio capture device 106, the location of the point of interest 110 could change such that the point of interest is located closer in proximity to audio capture device 108. In such a scenario, voice activity detection module 114 can be configured to switch the processing described above such that the audio feed captured by audio capture device 108 is processed to identify audio originating from the newly located point of interest. In various embodiments, this switch could be accomplished programmatically (e.g., via logic encoded in voice activity detection module 114) or at the selection of a user of computing device 102 (e.g., via user interface, voice command, or a hardware switch).

As depicted, in some embodiments, the sound processing system 104 also includes an acoustic echo cancelation (AEC) module 116. In such embodiments, the voice activity detection module 114 can output an audio feed to AEC module 116. The output audio feed could be, for example, the first processed audio feed, or the first audio feed itself, as these audio feeds would include a higher amplitude for those sounds, or frequencies, originating from the direction of the point of interest 110. The AEC module 116 can be configured to reduce an amount of echo contained within the audio feed output by the voice activity detection module 114. Such AEC configurations are known in the art and will not be discussed further herein.

In some embodiments, whether the voice activity detection module 114 outputs an audio feed to AEC module 116 could be contingent on whether the source confidence level of the first processed audio feed reaches or exceeds a source confidence threshold, or limit. In other embodiments, whether the voice activity detection module 114 outputs an audio feed to AEC module 116 could be contingent on whether the noise confidence level of the first processed audio feed reaches or exceeds a noise confidence threshold, or limit. As such, the voice activity detection module 114 could limit those instances where an audio feed is output to those instances where the voice activity detection module has established a sufficient level of confidence that the audio feed includes sound that originated from the direction of the point of interest to justify further processing. In doing so, voice activity detection module 114 can reduce energy expended by the AEC module 116, as well as any processing thereafter (e.g., by voice recognition module 118), and thereby conserve energy of the computing device 102, by reducing the amount of the output audio feed that is further processed.

The source confidence threshold or the noise confidence threshold could be predefined, preconfigured, or could be programmatically determined. In some embodiments, the source confidence threshold, or the noise confidence threshold, could be based on a current power level of computing device 102. For example, if computing device 102 is operating with a full battery, or is currently plugged into a continuous power source, the source confidence threshold could be set at a lower value than if the battery of computing device 102 is operating at a lower power level. As such, the source confidence threshold can, in some embodiments, be adjusted higher as the power level of computing device 102 decreases in an effort to further conserve battery life by limiting the amount of audio feed that is processed by AEC module 116, and any modules thereafter.

Sound processing system 104 may also optionally include a voice recognition module 118. Voice recognition module 118 could be configured to monitor the audio feed received by the voice recognition module 118 to identify one or more triggers contained within the received audio feed. The audio feed received by the voice recognition module 118 could come from AEC module 116, in embodiments where the AEC module 116 is included. In other embodiments, where the AEC module 116 is not included in sound processing system 114, or is included before the voice activity detection module 114, voice recognition module 118 could receive the audio feed directly from voice activity detection module 114. In such embodiments, the voice activity detection module 114 could be configured, as discussed above in reference to the AEC module 116, to only output an audio feed to voice recognition module 118 when the voice activity detection module 114 has established a sufficient level of certainty that the audio feed includes audio originating from the direction of the point of interest. This can be especially advantageous in scenarios where computing device 102 is capable of running in an always listening mode. As used herein, an always listening mode is one where sound processing system 104 is configured to continuously capture and process audio to identify triggers contained within the audio. Examples of applications that can utilize an always listening mode are represented by Cortana offered by Microsoft Corp., of Redmond, Wash., Google Now offered by Google Co. of Mountain View, Calif., or Siri, offered by Apple Inc. of Cupertino, Calif.

As mentioned previously, the audio feed captured by audio capture device 106 would include a higher amplitude for those sounds, or frequencies, originating from the direction of the point of interest 110 and therefore the first audio feed or a processed version of the first audio feed (e.g., filtered, attenuated, or processed by AEC module 116) could be provided to voice recognition module 118 to identify triggers originating from the point of interest 110.

One issue that is commonly encountered with the always listening modes mentioned above, is limiting the processing of the audio feed to those instances where the audio feed originates from the point of interest 110 (e.g., a user). By limiting the processing of audio feeds to audio feeds that include acoustic signals originating from the point of interest, as described above, the amount of processing required to operate in the always listening mode is reduced, which consequently reduces the amount of energy needed to operate in always listening mode. Another issue that is encountered with always listening mode is the ability to trigger an action that was not initiated by the user. For example, a nefarious person could walk past and give a command (e.g., a shutdown command, a power up command, etc.) to computing device 102 to cause the computing device 102 to perform an action that is not desired by the user. By limiting the processing of audio feeds to those audio feeds that include an acoustic signal that originates from a direction of the point of interest, as described above, the ability for a nefarious person to issue such a command from other directions would be limited. It will be appreciated that this is because a nefarious user that attempts to issue such a command from another direction would have that command reach the audio capture device (e.g., audio capture device 108) that is located further from the point of interest first. As a result, the amplitude for that nefarious user's command would be higher in the audio feed captured by the audio capture device further from the point of interest and lower in the audio feed captured by the audio capture device that is closer in proximity to the point of interest.

It will be appreciated that the benefits of the above described embodiments can extend beyond an always listening mode. For instance, the above described noise confidence threshold could be utilized to more efficiently identify background noise. As such, any applications that need to accurately identify noise could benefit from the above described embodiments as well. For example, speech coders often code identified noise with a lower number of bits than speech. This enables a lower average bit-rate for an audio feed, which can reduce an amount of processing of the audio feed thereby reducing the power consumption of a computing device performing this processing. In addition, noise reduction applications that seek to accurately estimate noise characteristics of an environment could also benefit from the above described embodiments, in particular, those including the noise confidence threshold. Additional benefits and applications of the above described embodiments will be readily understood by those of ordinary skill in the art, and the above examples are merely meant to illustrate a sampling of benefits that the above described embodiments can provide.

Figure 2A:
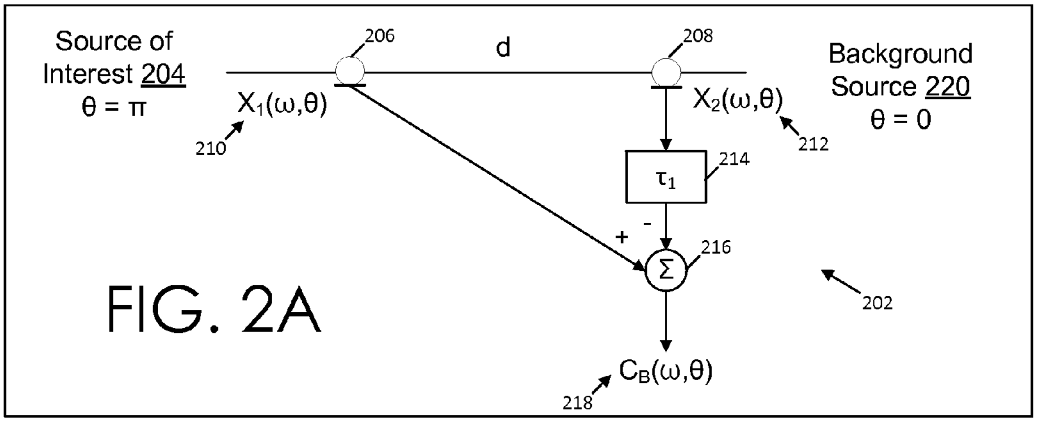
FIGS. 2A, 2B, and 2C depict illustrative schematic representations of sound processing system configurations, in accordance with various embodiments of the present disclosure.
Figure 2B:
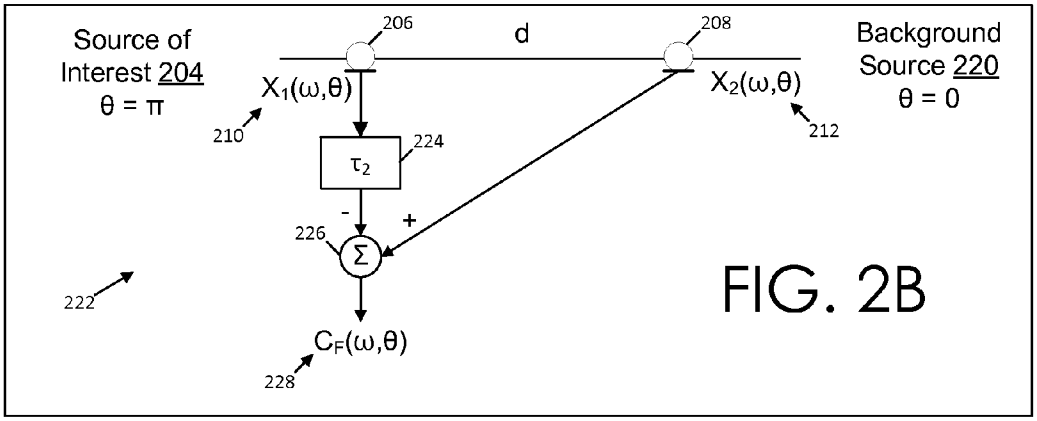
Figure 2C:
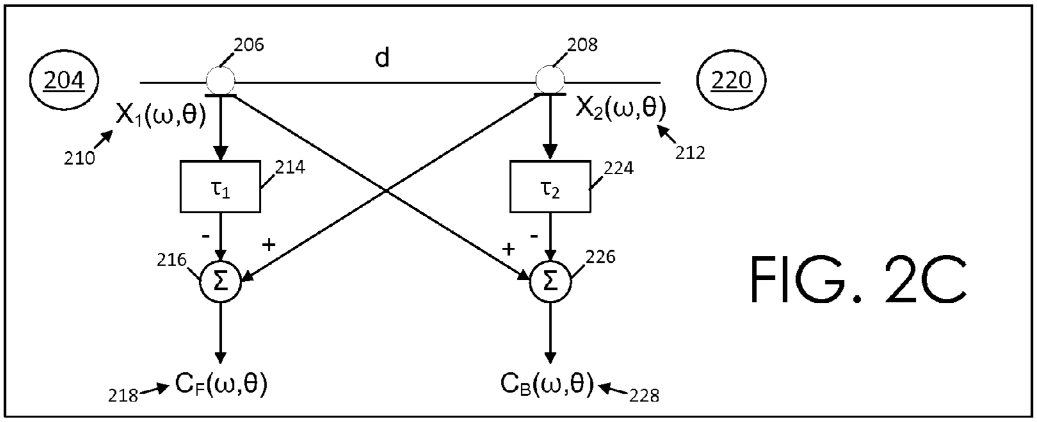

FIGS. 2A, 2B, and 2C depict illustrative schematic representations of sound processing system configurations, in accordance with various embodiments of the present disclosure. FIG. 2A depicts an illustrative representation of a portion of a sound processing system 202 configured to process two audio feeds, such as those discussed in reference to FIG. 1. As depicted, sound processing system 202 includes microphones 206 and 208. As can be seen, microphone 206 is located closer in proximity to a source of interest 204 than microphone 208 and microphones 206 and 208 are located distance 'd' from one another.

Microphone 206 can be configured to capture a first audio feed, represented here by $X_1(\omega,\theta)$ 210, hereinafter referred to simply as "first audio feed 210," where $\omega$ represents each frequency, or frequency range, contained within the first audio feed 210. Microphone 208 can be configured to capture a second audio feed, represented here by $X_2(\omega,\theta)$ 212, hereinafter referred to simply as "second audio feed 212." To process the two audio feeds it may be necessary to time synchronize the second audio feed 210 with the first audio feed 212. Such time synchronization is discussed in detail in reference to FIG. 1, above, and can include applying a delay to the second audio feed 212. This delay is depicted by $\tau_1$ in box 214, hereinafter merely referred to as delay 214. Delay 214 can reflect the amount of time it takes for sound to travel from the first microphone 206 to the second microphone 208 over distance 'd.'

The time synchronized first and second audio feeds can be received at 216, where, as indicated by the operators adjacent to the respective audio feeds, the first audio feed is attenuated, or filtered, utilizing the second audio feed to produce an attenuated, or filtered, audio feed, represented here by $C_B(\omega,\theta)$ 218, hereinafter merely referred to as processed audio feed 218. Again, $\omega$ represents each frequency, or frequency range, contained within the processed audio feed 218. It will be appreciated by those of ordinary skill in the art that the $C_B(\omega,\theta)$ represents an audio cardioid that is represented by the processed audio feed 218. It will also be appreciated that the depicted representation can be referred to in the art as placing a null at 0 degrees.

FIG. 2B depicts an illustrative representation of another portion of a sound processing system 222 configured to process the previously discussed first audio feed 210 and second audio feed 212; however, as can be seen, the depicted configuration is a mirror image of that discussed above in reference to FIG. 2A. As such, the portion of sound processing system 222 depicts processing of the second audio feed 212 utilizing the first audio feed 212. To accomplish this processing it may be necessary to time synchronize the first audio feed 210 with the second audio feed 212. As mentioned previously, this time synchronization can include applying a delay to the first audio feed 212. This delay is depicted by $\tau_2$ in box 224, hereinafter merely referred to as delay 224. Delay 224 can reflect the amount of time it takes for sound to travel from the first microphone 206 to the second microphone 208 over distance 'd.'

The time synchronized first and second audio feeds can be received at 226, where, as indicated by the operators adjacent to the respective audio feeds, the second audio feed is attenuated, or filtered, utilizing the first audio feed to produce an attenuated, or filtered, audio feed, represented here by $C_F(\omega,\theta)$ 228, hereinafter merely referred to as processed audio feed 228. Again, ω represents each frequency, or frequency range, contained within the processed audio feed 228. It will be appreciated by those of ordinary skill in the art that the $C_F(\omega,\theta)$ represents an audio cardioid that is represented by the processed audio feed 228. It will also be appreciated that the depicted representation can be referred to in the art as placing a null at 180 degrees.

FIG. 2C depicts an illustrative representation of the portions of sound processing system 202 and 222, discussed above, combined into a single system. As such, each of the above discussed aspects of FIGS. 2A and 2B are represented in FIG. 2C.

Figure 3A:
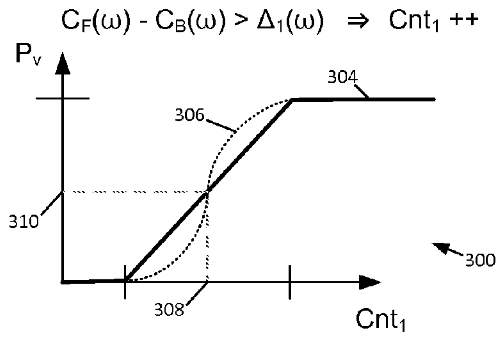
FIGS. 3A and 3B are graphical depictions of source confidence levels and noise confidence levels, in accordance with various embodiments of the present disclosure.
Figure 3B:
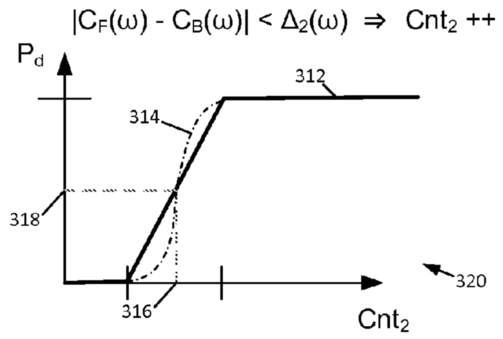

FIGS. 3A and 3B are graphical depictions of source confidence levels and noise confidence levels, in accordance with various embodiments of the present disclosure. FIG. 3A is an illustrative depiction of an example source confidence level. As can be seen, the calculation for determining the source confidence level depicted in FIG. 3A is based on an example algorithm defined by $C_F(\omega)-C_B(\omega)>\Delta_1(\omega)\rightarrow Cnt_1{++}$, where $C_F(\omega)$ represents a frequency, or frequency band, ω within a front cardioid, also referred to herein as a processed audio feed (e.g., processed audio feed 218, of FIGS. 2A and 2C); $C_B(\omega)$ represents the same frequency, or frequency band, ω within a back cardioid, also referred to herein as a processed audio feed (e.g., processed audio feed 228, of FIGS. 2B and 2C); $\Delta_1(\omega)$ represents a predefined threshold of difference, and $Cnt_1{++}$ represents a running tally of those frequencies, or frequency bands, that exceed the threshold of difference, $\Delta_1(\omega)$. The graph 300 depicts the running tally, $Cnt_1$, along the x-axis and a source confidence level, $P_v$, along the y-axis. As can be seen, as the running tally of frequencies that exceed the threshold of difference between the front cardioid and the back cardioid increases, so too does the source confidence level. As depicted, the dotted line 306 represents a function that signifies a source confidence limit, hereinafter referred to as "source confidence limit function 306," beyond which the source confidence level has sufficiently established that the front cardioid includes audio originating from the source of interest, or the direction of the source of interest. In embodiments, if the source confidence level has been sufficiently established, then further processing of the front cardioid, or the audio feed that was processed (e.g., attenuated or filtered) to produce the front cardioid, can be allowed (e.g., via voice recognition). As such, a source confidence level that is below line 310 would not be sufficiently established and would not be allowed to pass through for further processing. In accordance with the source confidence limit function 306, it can be seen that a $Cnt_1$ value of 308 would coincide with a sufficient source confidence level. It will be appreciated that this is merely meant to illustrate a possible source confidence level determination. As mentioned previously, the source confidence limit function 306 can be adjusted depending on the implementation details or depending on a current state (e.g., battery level) of the computing device that is implementing such a source confidence limit. In addition, it will be appreciated in the art that other methods, or algorithms, for determining a source confidence level can be utilized without departing from the scope of the present disclosure.

FIG. 3B, in contrast, is an illustrative depiction of an example noise confidence level. The noise confidence level depicted in FIG. 3B is based on an example algorithm defined by $|C_F(\omega)-C_B(\omega)|<\Delta_2(\omega)\rightarrow Cnt_2{++}$, where again $C_F(\omega)$ represents a frequency, or frequency band, ω within a front cardioid; $C_B(\omega)$ represents the same frequency, or frequency band, ω within a back cardioid; $\Delta_2(\omega)$ represents a predefined threshold of difference, and $Cnt_2{++}$ represents a running tally of those frequencies, or frequency bands, that are within a threshold of difference, $\Delta_2(\omega)$. The graph 320 depicts the running tally, $Cnt_2$, along the x-axis and a noise confidence level, $P_d$, along the y-axis. As can be seen, as the running tally of frequencies that are within the threshold of difference between the front cardioid and the back cardioid increases, so too does the noise confidence level. As depicted, the dotted line 314 represents a function that signifies a noise confidence limit, hereinafter referred to as "noise confidence limit function 314," beyond which the noise confidence level has sufficiently established that the front cardioid includes noise (e.g., background noise) rather than audio originating from the source of interest, or the direction of the source of interest. In embodiments, if the noise confidence level has been sufficiently established, then further processing of the front cardioid, or the audio feed that was processed (e.g., attenuated or filtered) to produce the front cardioid, may not be allowed. As such, a noise confidence level that is below line 318 would not be sufficiently established and would be allowed to pass through for further processing. In accordance with the noise confidence limit function 314, it can be seen that a $Cnt_2$ value of 316 would coincide with a sufficient source confidence level. It will be appreciated that this is merely meant to illustrate a possible noise confidence level determination. As mentioned previously, the noise confidence limit function 314 can be adjusted depending on the implementation details or depending on a current state (e.g., battery level) of the computing device that is implementing such a noise confidence limit. In addition, it will be appreciated in the art that other methods, or algorithms, for determining a noise confidence level can be utilized without departing from the scope of the present disclosure.

Figure 4:
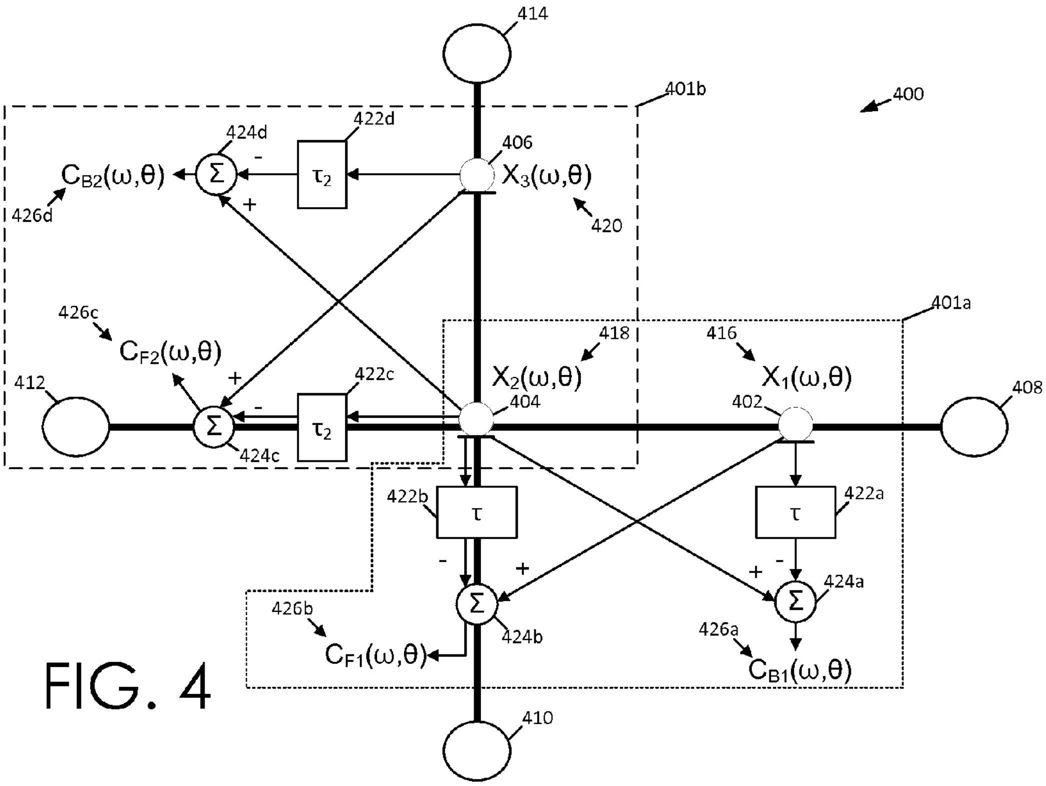
FIG. 4 depicts an illustrative schematic representation of a sound processing system having a three microphone configuration, in accordance with various embodiments of the present disclosure.

FIG. 4 depicts an illustrative schematic representation of a sound processing system 400 having a three microphone configuration, in accordance with various embodiments of the present disclosure. For the sake of clarity, various aspects of the sound processing system have been grouped into blocks 401*a* and 401*b*. These blocks are merely utilized for the sake of reference to apportion the functionality of sound processing system into units similar to that depicted in FIG. 2C and should not be thought of as limiting any aspect of this description. As depicted, sound processing system 400 includes microphones 402, 404, and 406. Each of sources 408-414 represent possible sources of sound and any sources 408-414 could be a source of interest. As such, any one of microphones 402-406 could be located closer in proximity to a source of interest than the other two microphones.

Microphone 402 can be configured to capture a first audio feed, represented here by $X_1(\omega,\theta)$ 416, hereinafter referred to simply as "first audio feed 416," where ω represents each frequency, or frequency range, contained within the first audio feed 416. Microphone 404 can be configured to capture a second audio feed, represented here by $X_2(\omega,\theta)$ 418, hereinafter referred to simply as "second audio feed 418." Microphone 406 can be configured to capture a third audio feed, represented here by $X_3(\omega,\theta)$ 420, hereinafter referred to simply as "third audio feed 420."

As can be seen, audio feeds 416-420 are processed in pairs, with the second audio feed 418 being processed twice, as indicated by the four arrows exiting microphone 404, once within block 401*a* with audio feed 416 and once within block 401*b* with audio feed 420.

Beginning with block 401*a*, to process the first audio feed 416 and the second audio feed 418 the two audio feeds may need to be time synchronized, as discussed elsewhere herein. As depicted, such time synchronization can include applying a delay (e.g., 422*a*-422*b*) to the respective audio feed that is being utilized to process (e.g., filter, attenuate, etc.) the other audio feed. For example at 424*a*, the first audio feed 416 is being utilized to process the second audio feed 418, as indicated by the operators adjacent to the respective audio feeds, to produce a processed audio feed represented by $C_{F1}(\omega,\theta)$ 426*a*, hereinafter merely referred to as processed audio feed 426*a*. As a result, the first audio feed 416 has had a delay 422*a* applied to it. In addition, at 424*b*, the second audio feed 418 is being utilized to process the first audio feed 416, as indicated by the operators adjacent to the respective audio feeds, to produce a processed audio feed represented by $C_{B1}(\omega,\theta)$ 426*b*, hereinafter merely referred to as processed audio feed 426*b*. As a result, the second audio feed 418 has had a delay 422*b* applied to it. Delay 422*a* and 422*b* can reflect the amount of time it takes for sound to travel between microphone 402 and microphone 404. It will be appreciated that, in some embodiments, the processing at 424*a* and 424*b* could be reversed such that the delay is being applied to the audio feed being processed. In such an embodiment, 424*a* would output $C_{F1}(\omega,\theta)$ and 424*b* would output $C_{B1}(\omega,\theta)$.

Moving to block 401*b*, to process the second audio feed 418 and the third audio feed 420 the two audio feeds may also need to be time synchronized. As depicted, such time synchronization can include applying a delay (e.g., 422*c*-422*d*) to the respective audio feed that is being utilized to process (e.g., filter, attenuate, etc.) the other audio feed. For example at 424*c*, the second audio feed 416 is being utilized to process the third audio feed 418, as indicated by the operators adjacent to the respective audio feeds received by 424*c*, to produce a processed audio feed represented by $C_{F2}(\omega,\theta)$ 426*c*, hereinafter merely referred to as processed audio feed 426*c*. As a result, the second audio feed 418 has had a delay 422*c* applied to it. In addition, at 424*d*, the third audio feed 420 is being utilized to process the second audio feed 418, as indicated by the operators adjacent to the respective audio feeds received at 424*d*, to produce a processed audio feed represented by $C_{B2}(\omega,\theta)$ 426*d*, hereinafter merely referred to as processed audio feed 426*d*. As a result, the third audio feed 420 has had a delay 422*d* applied to it. Delay 422*c* and 422*d* reflect the amount of time it takes for sound to travel between microphone 404 and microphone 406. As with 424*a* and 424*b*, it will be appreciated that, in some embodiments, the processing at 424*c* and 424*d* could be reversed such that the delay is being applied to the audio feed being processed. In such an embodiment, 424*c* would output $C_{B2}(\omega,\theta)$ and 424*d* would output $C_{F2}(\omega,\theta)$.

Figure 5:
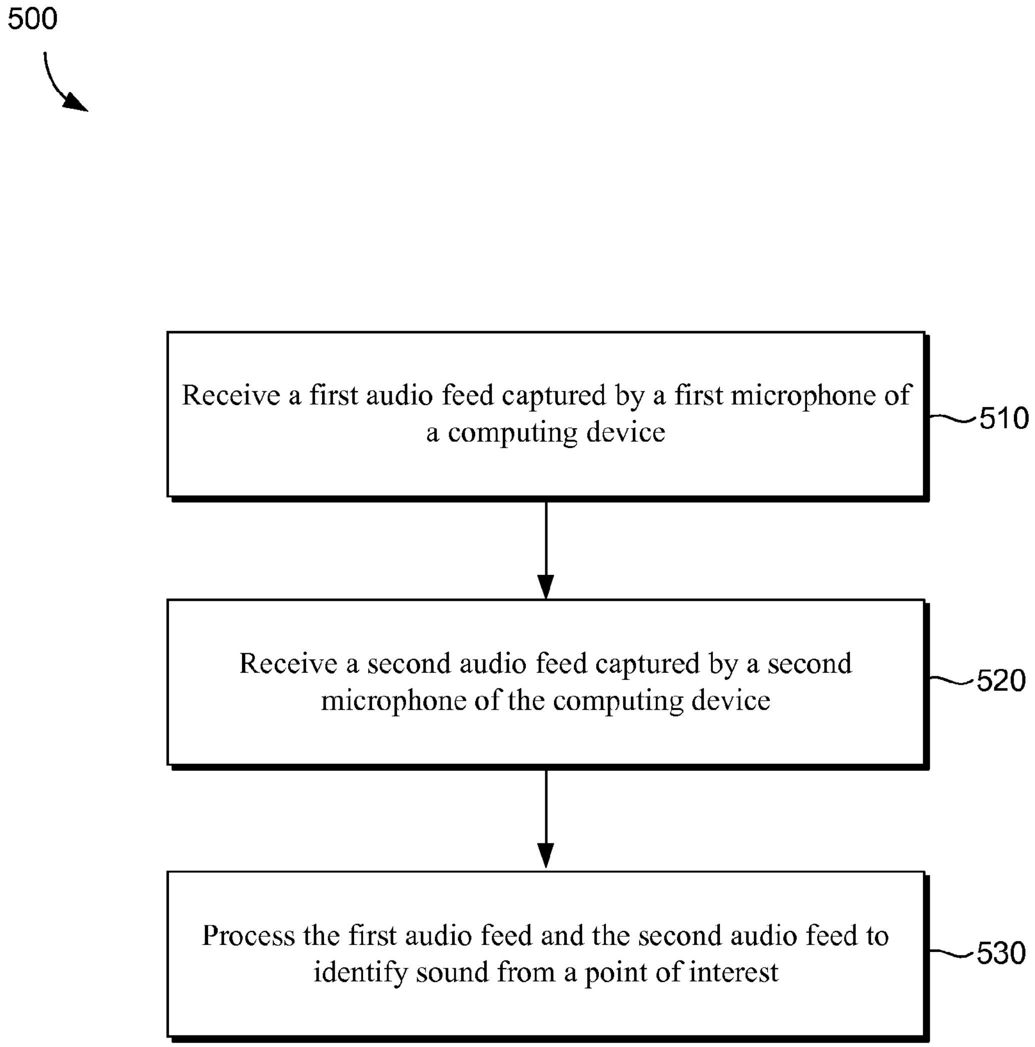
FIG. 5 is a flow diagram depicting an illustrative method for identifying sound from a source of interest, in accordance with various embodiments of the present disclosure.

FIG. 5 is a flow diagram depicting an illustrative method 500 for identifying sound from a source of interest, in accordance with various embodiments of the present disclosure. Method 500 may be carried out, for example, by a voice activity detector. Method 500 begins at block 510 where a first audio feed captured by a first microphone of a computing device is received. At block 520 a second audio feed captured by a second microphone of the computing device is received. It will be appreciated that block 510 and block 520 can occur contemporaneously, at least substantially contemporaneously. As mentioned previously in reference to FIG. 1, these microphones can be any type, kind, or combination of microphones. In embodiments, the first microphone can be situated closer to a point of interest than the second microphone. In such embodiments, the audio originating from the point of interest would be larger in magnitude when captured by the first microphone than when captured by the second microphone.

At block 530 the first audio feed and the second audio feed are processed to identify sound originating from the point of interest. In some embodiments, this processing may begin by time synchronizing the first audio feed with the second audio feed. This time synchronizing can be accomplished, for example, by applying a delay to one of the first or second audio feeds, as described above.

In some embodiments, the processing of the first audio feed and the second audio feed can include processing the first audio feed utilizing the second audio feed. In such embodiments, the processing can include attenuating, or filtering, frequencies from the first audio feed, that are shared between the first audio feed and the second audio feed, as described in reference to FIG. 1. In various embodiments, the processing of the first audio feed and the second audio feed can also include processing the second audio feed, utilizing the first audio feed, to further enable the identification of sound originating from the point of interest, or at least sound originating from the direction of the point of interest. Again, in such embodiments, the processing can include attenuating, or filtering, frequencies from the second audio feed, that are shared between the first audio feed and the second audio feed, as described in reference to FIG. 1.

Figure 6:
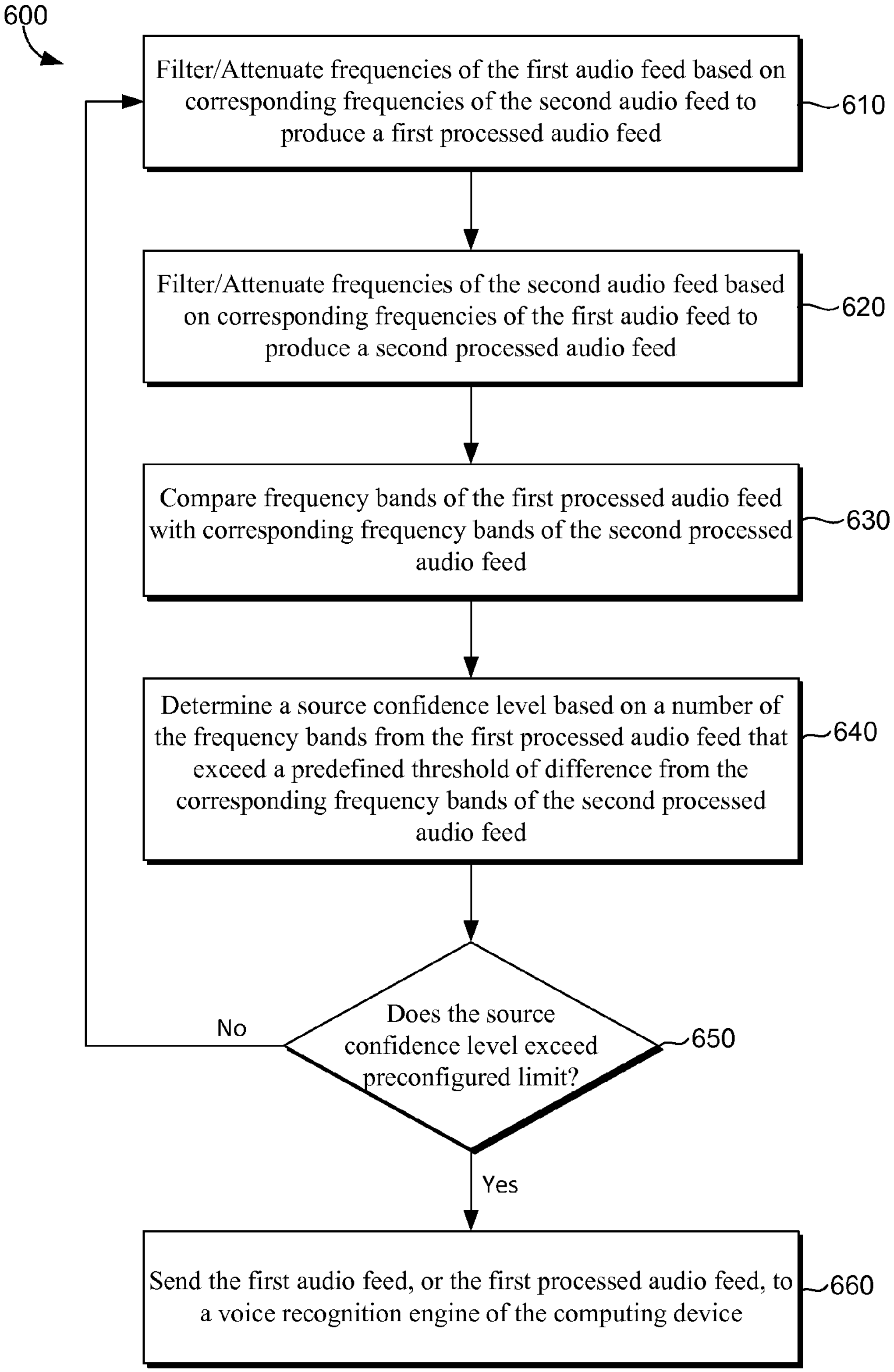
FIG. 6 is a flow diagram depicting an illustrative method for processing a first and second audio feed to identify sound from a source of interest, in accordance with various embodiments of the present disclosure.

Another embodiment that depicts the processing of a first and second audio feeds, represented by block 530 of FIG. 5, is depicted by process flow 600 of FIG. 6. Process flow 600 begins at block 610, where frequencies contained within the first audio feed are attenuated, or filtered, based on corresponding frequencies of the second audio feed to produce a first processed audio feed. At block 620, frequencies within the second audio feed are attenuated, or filtered, based on corresponding frequencies contained within the first audio feed to produce a second processed audio feed.

At block 630, the frequency bands contained within the first processed audio feed and the second processed audio feed are compared against one another (e.g., for amplitude differences). At block 640, a source confidence level can be determined based on the comparison that occurred at block 630. This source confidence level is indicative of whether sound is originating from the point of interest, or the direction of the point of interest. Such a determination may be based on the number of frequency bands of the first processed audio feed that exceed a predefined, or preconfigured, threshold of difference from corresponding frequency bands of the second processed audio feed. In embodiments, a higher value for the source confidence level can be more indicative of sound within the first processed audio feed originating from point of interest than a lower value for the source confidence level.

Figure 7:
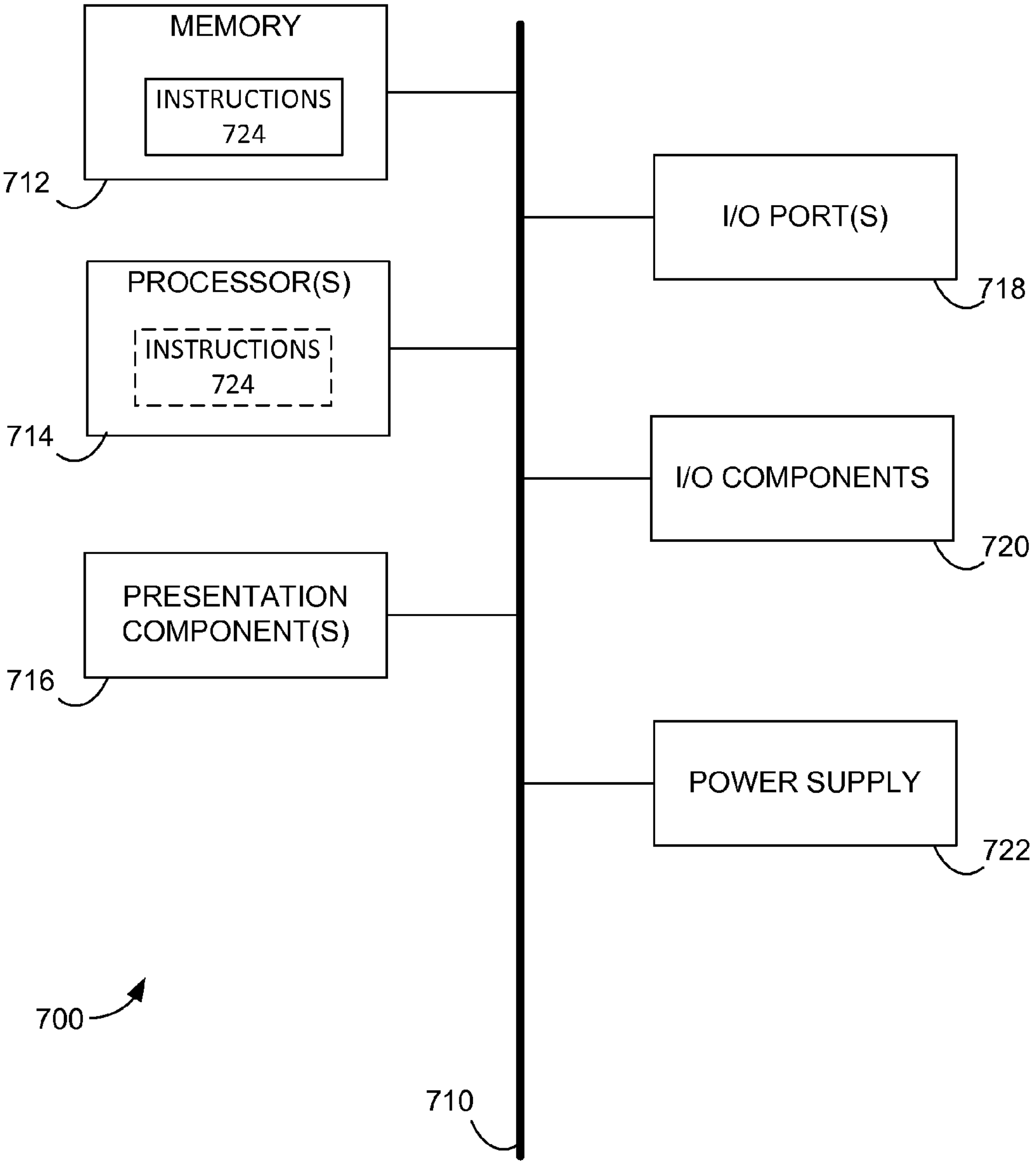
FIG. 7 is a block diagram of an illustrative computing environment suitable for use in implementing embodiments described herein.

At block 650, a determination is made as to whether the source confidence level, determined at block 640, exceeds a preconfigured limit (e.g., source confidence limit). As mentioned previously, this preconfigured limit can change depending on a state (e.g., charge level) of the computing device performing the process flow 600. If the source confidence level does not exceed the preconfigured limit, then the processing can return to block 610 and this process can be repeated. If, however, the source confidence level exceeds the preconfigured limit, then the processing proceeds to block 660 where the first audio feed, or the first processed audio feed is sent to a voice recognition engine of the computing device Having briefly described an overview of embodiments of the present disclosure, an illustrative operating environment in which embodiments of the present disclosure may be implemented is described below in order to provide a general context for various aspects of the present disclosure. Referring initially to FIG. 7 in particular, an illustrative operating environment for implementing embodiments of the present disclosure is shown and designated generally as computing device 700. Computing device 700 is but one example of a suitable computing environment and is not intended to suggest any limitation as to the scope of use or functionality of the disclosure. Neither should the computing device 700 be interpreted as having any dependency or requirement relating to any one or combination of components illustrated.

The disclosure may be described in the general context of computer code or machine-useable instructions, including computer-executable instructions such as program modules or engines, being executed by a computer or other machine, such as a personal data assistant or other handheld device. Generally, program modules including routines, programs, objects, components, data structures, etc. refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 7 is merely illustrative of an example computing device that can be used in connection with one or more embodiments of the present disclosure. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. As depicted, memory 712 includes instructions 724. Instructions 724, when executed by processor(s) 714 are configured to cause the computing device to perform any of the operations described herein, in reference to the above discussed figures. The memory may be removable, non-removable, or a combination thereof. Illustrative hardware devices include solid-state memory, hard drives, optical-disc drives, etc. Computing device 700 includes one or more processors that read data from various entities such as memory 712 or I/O components 720. Presentation component(s) 716 present data indications to a user or other device. Illustrative presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A sound processing system comprising:

a first audio capture device and a second audio capture device, wherein the first audio capture device is located in closer proximity to a point of interest than the second audio capture device;

a voice activity detection module to:

receive first and second audio feeds respectively captured by the first and second audio capture devices;

attenuate at least a portion of the first audio feed based on a corresponding portion of the second audio feed to generate a first attenuated audio feed;

attenuate at least a portion of the second audio feed based on a corresponding portion of the first audio feed to generate a second attenuated audio feed;

compare frequency bands of the first attenuated audio feed with corresponding frequency bands of the second attenuated audio feed; and determine a source confidence level based on a number of the frequency bands from the first attenuated audio feed that exceed a predefined threshold of difference from the corresponding frequency bands of the second attenuated audio feed, wherein the source confidence level is indicative of whether sound is originating from the point of interest.

2. The sound processing system of claim 1, wherein a higher value for the source confidence level is more indicative of sound within the first attenuated audio feed originating from the point of interest than a lower value for the source confidence level.

3. The sound processing system of claim 1, wherein to attenuate at least the portion of the first audio feed based on the corresponding portion of the second audio feed is to attenuate one or more frequencies contained within the first audio feed that are contained within the second audio feed, and wherein to attenuate at least the portion of the second audio feed based on the corresponding portion of the first audio feed is to attenuate one or more frequencies contained within the second audio feed that are contained within the first audio feed.

4. The sound processing system of claim 1, wherein the voice activity detection module is further to:

time synchronize the first audio feed with the second audio feed prior to attenuating at least the portion of the first audio feed; and time synchronize the second audio feed with the first audio feed prior to attenuating at least the portion of the second audio feed.

5. The sound processing system of claim 1, wherein to time synchronize the first audio feed with the second audio feed is to apply a first delay to the first audio feed, the first delay reflecting the amount of time it takes for sound to travel from the first audio capture device to the second audio capture device, and wherein to time synchronize the second audio feed with the first audio feed is to apply a second delay to the second audio feed, the second delay reflecting the amount of time it takes for sound to travel from the second audio capture device to the first audio capture device.

6. The sound processing system of claim 1, further comprising:

a voice recognition module to:

receive the first attenuated audio feed;

monitor the first attenuated audio feed to identify one or more triggers contained within the first attenuated audio feed; and cause one or more actions to occur in response to identifying the one or more triggers.

7. The sound processing system of claim 6, wherein the voice activity detection module is further to: output the first attenuated audio feed to the voice recognition engine in response to a determination that the source confidence level exceeds a preconfigured limit.

8. The sound processing system of claim 7, wherein the preconfigured limit varies based upon a power level of a computing device that hosts the sound processing system.

9. The sound processing system of claim 1, wherein the voice activity detection module is further to:

determine a noise confidence level based on a number of the frequency bands from the first audio feed that are within a predefined threshold of difference from the corresponding frequency bands of the second audio feed, wherein a higher value for the noise confidence level is more indicative of sound within the first audio feed being noise than a lower value for the noise confidence level.

10. The sound processing system of claim 1, further comprising an acoustic echo cancellation (AEC) module that is to: reduce an amount of echo contained within the first attenuated audio feed.

11. One or more computer storage hardware media device having computer-executable instructions embodied thereon that, when executed, by one or more processors of a computing device, causes the one or more processors to: perform a method for processing sound, the method comprising:

filtering a first audio feed utilizing a second audio feed to produce a filtered audio feed, wherein the first audio feed is captured by a first microphone and the second audio feed is captured by a second microphone, the first microphone being closer in proximity to an audio source of interest than the second microphone; and identifying whether the first audio feed contains sound originating from a direction of the source of interest based on frequencies contained within the filtered audio feed.

12. The one or more computer storage media of claim 11, wherein the filtered audio feed is a first filtered audio feed the method further comprising:

filtering the second audio feed utilizing the first audio feed to produce a second filtered audio feed, wherein identifying whether the first audio feed contains sound originating from the direction of the source of interest includes comparing frequency bands of the first filtered audio feed with corresponding frequency bands of the second filtered audio feed; and determining a source confidence level based on a number of the frequency bands from the first filtered audio feed that exceed a predefined threshold of difference from the corresponding frequency bands of the second filtered audio feed.

13. The one or more computer storage media of claim 12, the method further comprising sending the filtered audio feed to a voice recognition engine of the computing device in response to the source confidence level exceeding a preconfigured limit.

14. The one or more computer storage media of claim 13, wherein the preconfigured limit varies based upon a power level of the computing device.

15. The one or more computer storage media of claim 12, wherein filtering the first audio feed utilizing the second audio feed further comprises filtering frequencies from the first audio feed that are contained within the second audio feed, and wherein filtering the second audio feed utilizing the first audio feed further comprises filtering frequencies from the second audio feed that are contained within the first audio feed.

16. A computer-implemented method for voice activity detection comprising:

receiving a first audio feed captured by a first microphone of a computing device and a second audio feed captured by a second microphone of the computing device, wherein the first microphone is closer in proximity to a source of interest than the second microphone; and processing the first audio feed utilizing the second audio feed to enable identification of sound originating from a direction of the source of interest.

17. The computer-implemented method of claim 16, wherein processing the first audio feed utilizing the second audio feed comprises:

filtering frequencies of the first audio feed based on corresponding frequencies of the second audio feed to produce a filtered audio feed.

18. The computer-implemented method of claim 16, wherein processing the first audio feed utilizing the second audio feed comprises:

attenuating frequencies of the first audio feed based on corresponding frequencies of the second audio feed to produce an attenuated audio feed.

19. The computer-implemented method of claim 16, wherein processing the first audio feed utilizing the second audio feed comprises:

filtering frequencies of the first audio feed based on corresponding frequencies of the second audio feed to produce a first filtered audio feed;

filtering frequencies of the second audio feed based on corresponding frequencies of the first audio feed to produce a second filtered audio feed;

comparing frequency bands of the first filtered audio feed with corresponding frequency bands of the second filtered audio feed; and determining a source confidence level based on a number of the frequency bands from the first filtered audio feed that exceed a predefined threshold of difference from the corresponding frequency bands of the second filtered audio feed, wherein a higher value for the source confidence level is more indicative of sound within the first audio feed originating from the direction of the source of interest than a lower value for the source confidence level.

20. The computer-implemented method of claim 19, wherein the source of interest is a user of the computing device, the method further comprising:

sending the first filtered audio feed to a voice recognition engine of the computing device in response to a determination that the value for the source confidence level exceeds a preconfigured limit, wherein the preconfigured limit is based upon a current power level of the computing device, and wherein a higher preconfigured limit reduces the amount of the first audio feed that is output to the voice recognition engine.

* * * * *